No. 651,267. Patented June 5, 1900.
E. F. PICKETT.
TIRE VALVE INSERTER.
(Application filed Aug. 26, 1899.)
(No Model.)
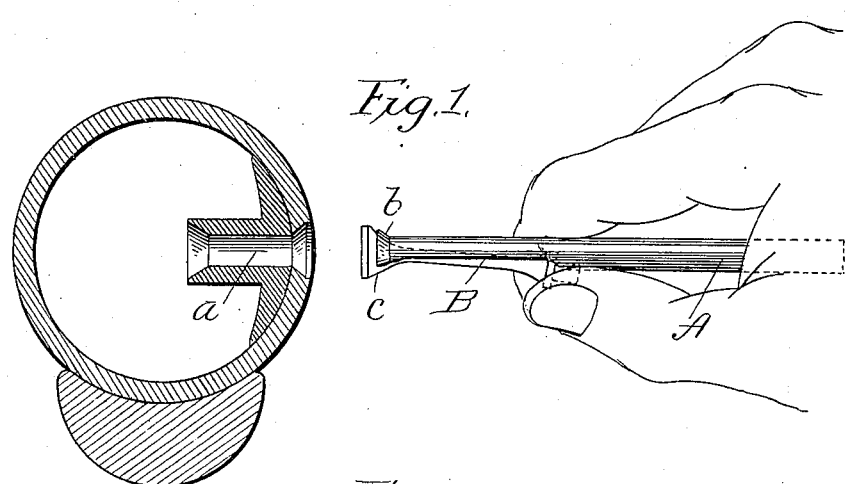
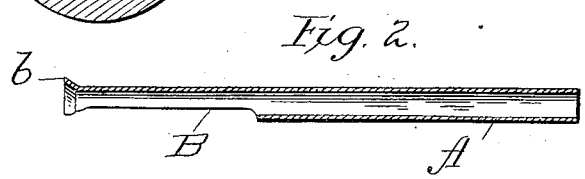
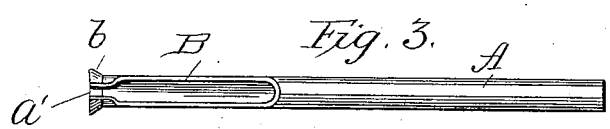
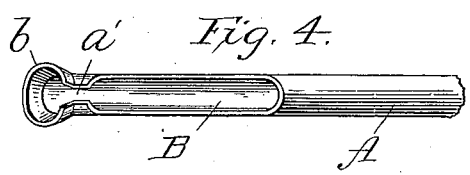
Witnesses
Walter Donaldson
Wm. F. Hall
Inventor
EDWARD F. PICKETT
by F. L. Middleton
Attorney

UNITED STATES PATENT OFFICE.

EDWARD F. PICKETT, OF BUFFALO, NEW YORK, ASSIGNOR TO THE AMERICAN PNEUMATIC VALVE COMPANY, OF NEW YORK.

TIRE-VALVE INSERTER.

SPECIFICATION forming part of Letters Patent No. 651,267, dated June 5, 1900.

Application filed August 26, 1899. Serial No. 728,605. (No model.)

*To all whom it may concern:*

Be it known that I, EDWARD F. PICKETT, a citizen of the United States, residing at Buffalo, in the county of Erie and State of New York, have invented certain new and useful Improvements in Tire-Valve Inserters, of which the following is a specification.

In Patent No. 612,570, dated October 18, 1898, granted to me and in an application of even date herewith I have shown a valve for pneumatic tires comprising a valve-casing and two valve parts connected by an elastic stem, the valve parts and stem being preferably of soft rubber. It is necessary to introduce the valves and stem into the casing and to replace them when worn; and it is the object of the present invention to provide a simple form of device for doing this effectually and quickly, rendering unnecessary the deflation of the tire for this purpose.

In the accompanying drawings, Figure 1 shows a sectional view of a tire embodying my improved valve-casing with a view of the valves to be inserted held in the inserter. Fig. 2 is a section of the inserter. Fig. 3 is an elevation of the same. Fig. 4 is a perspective view of the inserter.

In Fig. 1 the tire and valve casing is identical with that shown in my pending application of even date herewith. The valves and stem, of one piece of rubber, require to be inserted through the contracted opening $a$ of the valve-casing, and to accomplish this I use a tube of metal which I may designate an "inserter." This is of suitable length to be conveniently held in the hand and is preferably in the form of a simple tube for the outer half A of its length. The periphery of the tube is cut into and removed, as at B, for about half of the circumference of the tube and to near the end; but between the open end of the tube and the cut-away portion the opening is reduced, as at $a'$, to form a contracted passage. The end of the tube is made slightly flaring, as at $b$. To insert the valves and stem, the stem is distended until it passes through the contracted passage $a'$, and the inner valve $c$ is seated in the flaring end $b$ of the inserter. The opposite valve is grasped by the fingers, as shown in Fig. 1, and the stem stretched, and the valve $c$ is then forcibly pressed through the valve-casing until the valve $c$ reaches its seat. The pull on the outer valve is then relaxed, the inner valve expands to fit its seat, and the outer valve readily finds its seat, and thus the insertion is effected instantly.

What I claim is—

1. An inserter comprising a tube having a flaring end, a cut-away portion and a contracted opening between, substantially as described.

2. An inserter for a flexible stem-valve part, comprising a seat for the valve integrally formed on the outer end of the said inserter, and a passage at one side opening into the said valve-seat through which the flexible stem-valve part may be drawn, substantially as described.

In testimony whereof I affix my signature in presence of two witnesses.

EDWARD F. PICKETT.

Witnesses:
HENRY E. COOPER,
R. E. OURAND.